Oct. 21, 1924.
W. W. CRANER
1,512,523
MILK CAN VENTILATOR
Filed Nov. 11, 1922
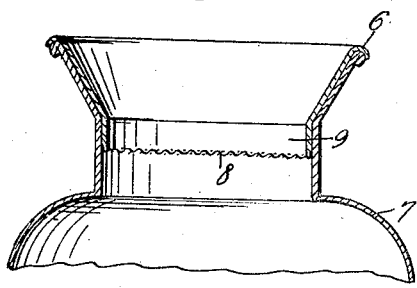
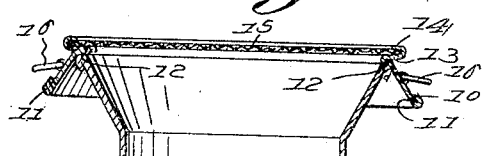
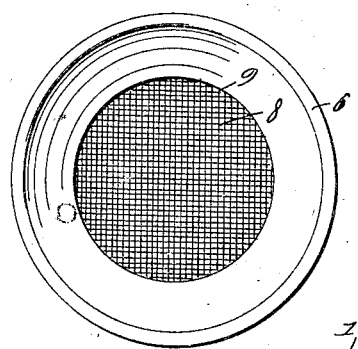
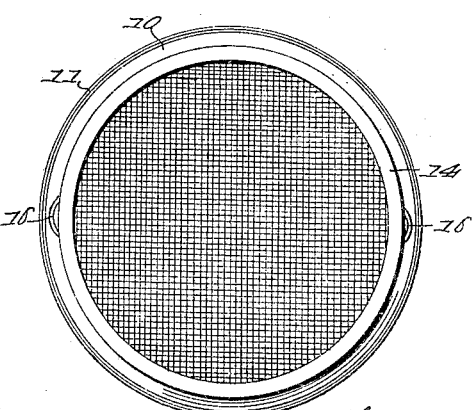
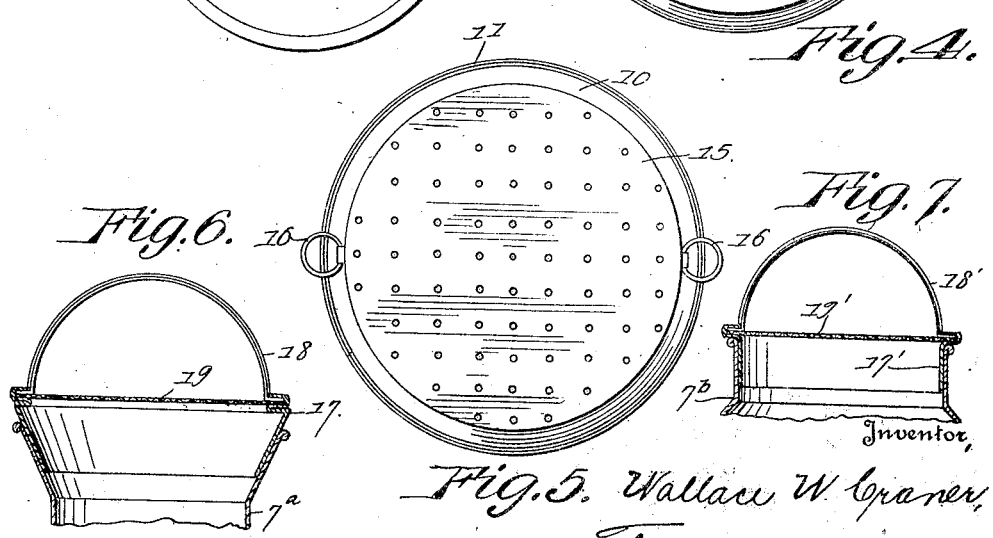
Inventor,
Wallace W. Craner,
By Frank S. Ackerman,
Attorney Patented Oct. 21, 1924.

1,512,523

UNITED STATES PATENT OFFICE.

WALLACE W. CRANER, OF BUHL, IDAHO.

MILK-CAN VENTILATOR.

Application filed November 11, 1922. Serial No. 600,326.

*To all whom it may concern:*

Be it known that I, WALLACE W. CRANER, a citizen of the United States of America, and resident of Buhl, in the county of Twin Falls and State of Idaho, have invented certain new and useful Improvements in Milk-Can Ventilators, of which the following is a specification.

This invention appertains to certain improvements in covers for milk cans, such cover comprising a retaining element which carries a foraminous piece of woven metal of fine mesh, which is secured to the rim and serves in use to protect the contents of the milk can and as a ventilator therefor.

Heretofore, it has been proposed to provide ventilators for milk cans which have been made to hold in place a piece of textile material, as cheesecloth. Cheesecloth is objectionable for this purpose and requires constant removal and washing, whereas a metallic ventilator is more lasting and efficient.

In the accompanying drawings,—

Figure 1 illustrates a sectional view, showing a ventilator applied to a milk can;

Figure 2 illustrates a plan view of the structure shown in Fig. 1;

Figure 3 illustrates a preferred embodiment of my invention, wherein the ventilator and rim therefor are maintained by the upper open end of the milk can;

Figure 4 illustrates a plan view of the structure shown in Fig. 3;

Figures 5, 6 and 7 illustrate modifications of the invention.

Referring to the drawings, Fig. 1 shows a structure of funnel form, the upper marginal portion being outturned as shown at 6, to engage with the upper flared end of the milk can 7.

The wall of the frame which carries the ventilator 8 has a cylindrical portion 9 to which the foraminous element of the structure is soldered, or otherwise attached, and above the cylindrical portion the frame flares outwardly and terminates with the curved portion 6.

In Fig. 3 of the drawings, the upper portion of the milk can is shown of the same configuration as has been illustrated by Fig. 1, and the ventilator or protector which closes the mouth of the can has a rim 10, which is reinforced at its lower margin, in use, by upsetting the metal upon itself, as shown at 11. The rim portion of the ventilator projects and is provided at its upper portion with bends to provide a shoulder 12 that extends inward, and a second shoulder 13 that forms the outer margin of the rim; also an inturned portion which overlies and clamps in a recess so formed a foraminous ventilator of metal woven of close mesh. Instead of using a woven wire fabric, the supporting frame of sheet metal may maintain a perforated sheet metal disk 15, the rim having rings or handles 16 appropriately attached thereto.

This device provides a screen and ventilator for the milk can, and in use it covers the mouth of the can, and is adapted to be applied to milk cans having mouths of different diameters, and is effective even when the mouth of the can is bent or distorted, and it will be noted that such a ventilator as I have shown by Figs. 3 and 4 is readily applicable to milk cans of different sizes, whereas the structure shown by Figs. 1 and 6 are applicable only to milk cans of certain sizes.

Figure 6 of the drawings shows a further modification of my invention, and in this embodiment, the structure has a conical portion 17 of sheet metal, to which is attached a disk of woven wire fabric of suitable mesh, the upper margins extending outward and then inward to provide a circumferential recess in which the margin of the foraminous disk is located and held.

A handle 18 of suitable width is attached in an appropriate manner and overlies and guards the woven wire fabric or foraminous disk.

The portion of the device which contacts with the interior of the mouth of a milk can being tapered or conical, can be used with various sizes of cans having either straight or flared openings.

Figure 7 of the drawings shows a further modification in which the body portion is cylindrical and such modification is adapted for use with milk cans with straight walled mouths of fixed size or with various sizes of milk cans which have flared mouths, and in use, the lower edge will impinge to support the structure by contact with the inner portion of the flared mouth of the can.

I claim:

1. An improved article of manufacture, a ventilator and strainer for milk cans comprising a rim which is bent upon itself to provide a recess in which is seated the margin of a foraminous metallic disk, the bends also forming an inwardly extending shoulder beyond which the rim is flared and a handle which traverses the disk, the same having laterally projecting end portions which are seated in the recess and overlie the disk substantially as shown, for use with a milk can having a flared mouth.

2. A ventilating and protecting cover for milk cans having a flared mouth, comprising a rim made up to provide a flared portion, the upper portion thereof being bent upon itself to provide an inward extending shoulder, a portion of the rim above the shoulder being further bent to provide a circumferential recess and a foraminous disk the margin of said disk being seated and held in the said recess.

3. An improved article of manufacture, a milk strainer and ventilator comprising a portion which is adapted to fit within the mouth of a can, the same being provided with a bend or fold which embraces the margin of a strainer, a bowed handle having outwardly bent ends at an angle with the grasping portion of the handle, said ends being seated within the recess and in contact with the straining element, substantially as shown.

WALLACE W. CRANER.